United States Patent
Kim

[11] Patent Number: 5,836,556
[45] Date of Patent: Nov. 17, 1998

[54] HOUSING HAVING ADJUSTABLE SUPPORT LEGS FOR LEVELING THE HOUSING

[75] Inventor: Ho Young Kim, Pyungtaek, Rep. of Korea

[73] Assignee: Samsung Electronics Co., Ltd., Suwon, Rep. of Korea

[21] Appl. No.: 597,459

[22] Filed: Feb. 2, 1996

[30] Foreign Application Priority Data

Feb. 4, 1995 [KR] Rep. of Korea ..................... 1995 1694

[51] Int. Cl.⁶ ................................................ F16M 11/24
[52] U.S. Cl. ........................................................ 248/188.4
[58] Field of Search ................................ 248/188.4, 649, 248/188.2, 688; 411/417

[56] References Cited

U.S. PATENT DOCUMENTS 1,390,904  9/1921  Hazelton ............................. 411/417 X

FOREIGN PATENT DOCUMENTS 641767    5/1962   Canada ................................. 411/417
1014454   7/1977   Canada ................................. 411/417
2289794  10/1974   France ................................. 411/417
59/181396 12/1984  Japan .

*Primary Examiner*—Ramon O. Ramirez
*Attorney, Agent, or Firm*—Burns, Doane, Swecker & Mathis, L.L.P.

[57] ABSTRACT

A washing machine rests on a plurality of fixing members that are attached to respective support legs. The fixing members can be released from the support legs to enable the washing machine to be vertically moved and made level. Each support leg includes circumferentially spaced externally threaded portions, and each fixing member includes circumferentially spaced internally threaded portions. Each fixing member is rotatable relative to its respective support leg about an axis of the support leg. In one rotational position of the fixing member, its internally threaded portions engage respective externally threaded portions to prevent the housing from moving vertically relative to the associated support leg. In another rotational position of the fixing member, its internally threaded portions are disengaged from the externally threaded portions to enable the housing to be adjusted vertically against the upward bias of the spring which biases the fixing member upwardly.

2 Claims, 4 Drawing Sheets

HOUSING HAVING ADJUSTABLE SUPPORT LEGS FOR LEVELING THE HOUSING

BACKGROUND OF THE INVENTION

The present invention concerns a washing machine with a level adjustment contrivance, and more particularly a level adjustment contrivance, which comprises a plurality of adjustment legs for supporting the bottom of the housing of the washing machine, a fixing member attached to each of the adjustment legs for fixing the housing at a position along each adjustment leg, and a support spring mounted on the lower part of each adjustment leg.

FIG. 4 illustrates a conventional level adjustment contrivance mounted on a washing machine as typically disclosed in Japanese Utility Model Laid-Open Publication No. Sho 59(1984)-181396, where the bottom of the housing 1 of a washing machine is provided with a plurality of mounting holes 9 for respectively receiving a plurality of adjustment legs 2. A support spring 3 is mounted on the lower part of each adjustment leg 2 so as to resiliently support the bottom of the housing 1. The lower end of each adjustment leg 2 is integrally provided with a rubber plate 8. Also provided between the support spring 3 and the housing 1 is an adjustment casing 7, the bottom of which rests on the upper end of the support spring 3, and through which the adjustment leg 2 passes. The upper part of the leg 2 positioned inside of the adjustment casing 7 is mounted by an anchor spring 4, which is a kind of coil spring. This coil spring is to hold the adjustment leg 2 with one end fixed to the adjustment casing 7 and the other end extended to the outside of the casing 7 through an adjustment opening 6. The adjustment opening 6 is elongated in the direction normal to FIG. 4 so as to allow a side movement of the other end of the anchor spring 4 provided with a handle 5.

In such a conventional washing machine, when the handle 5 of the anchor spring 4 is rotated counterclockwise as shown in FIG. 5B, the internal diameter 4D of the anchor spring 4 is expanded to release the adjustment leg 2. Then, by pushing the housing 1 raised by the resilient force of the support spring 3 the level of the housing 1 can be adjusted. When the adjustment of the level of the housing is completed, the handle 5 is released to make the anchor spring 4 grip the adjustment leg 2 by the recuperating force of the spring, as shown in FIG. 5A. Thus, the adjusted level of the housing is maintained. Namely, the level is kept by the frictional force working between the inside surface of the anchor spring 4 and the peripheral surface of the adjustment leg 2. However, when a force high enough to overcome the frictional force is exerted on the housing, the anchor spring 4 slips along the adjustment leg 2 breaking the level. Furthermore, when frequent adjustment causes the frictional coefficient of the peripheral surface of the adjustment leg to be degraded, the anchoring of the anchor spring becomes impossible.

SUMMARY OF THE INVENTION

It is an object of the present invention to provide a level adjustment apparatus, which may to easily maintain the level of the housing of a washing machine by firmly fixing the housing on the adjustment leg.

According to an embodiment of the present invention, there is provided a washing machine with a level adjustment apparatus for making the body of the washing machine level, which comprises a housing for installing the body, a plurality of adjustment legs for supporting the bottom of the housing, a fixing member attached to each of the adjustment legs for fixing the housing at a position along each adjustment leg, and a support spring mounted on the lower part of each adjustment leg. The upper parts of the adjustment legs are inserted into the bottom. Each adjustment leg has outer peripheral threaded portions, and the fixing member has inner peripheral threaded portions engaging with the outer peripheral threaded portions. The fixing member is designed to freely move along the adjustment leg when adjusting the level of the body.

The present invention will now be described more specifically with reference to the drawings attached only by way of example.

BRIEF DESCRIPTION OF THE ATTACHED DRAWINGS

DETAILED DESCRIPTION OF A PREFERRED EMBODIMENT

Figure 1:
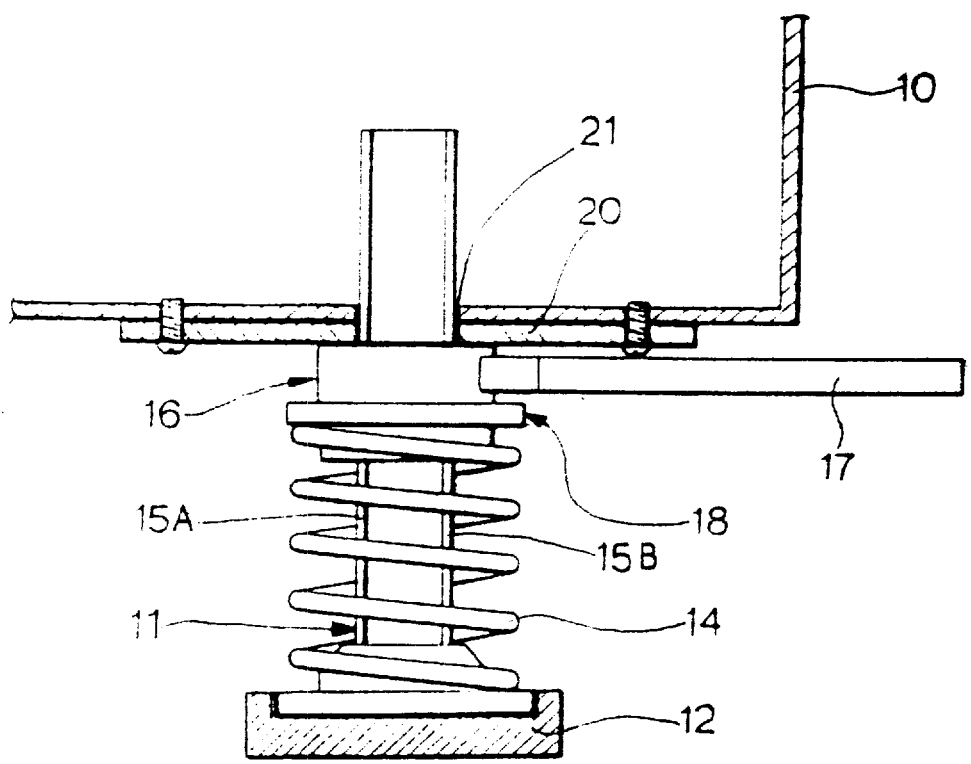
FIG. 1 is a partial cross sectional view of a level adjustment contrivance according to an embodiment of the present invention.
Figure 2:
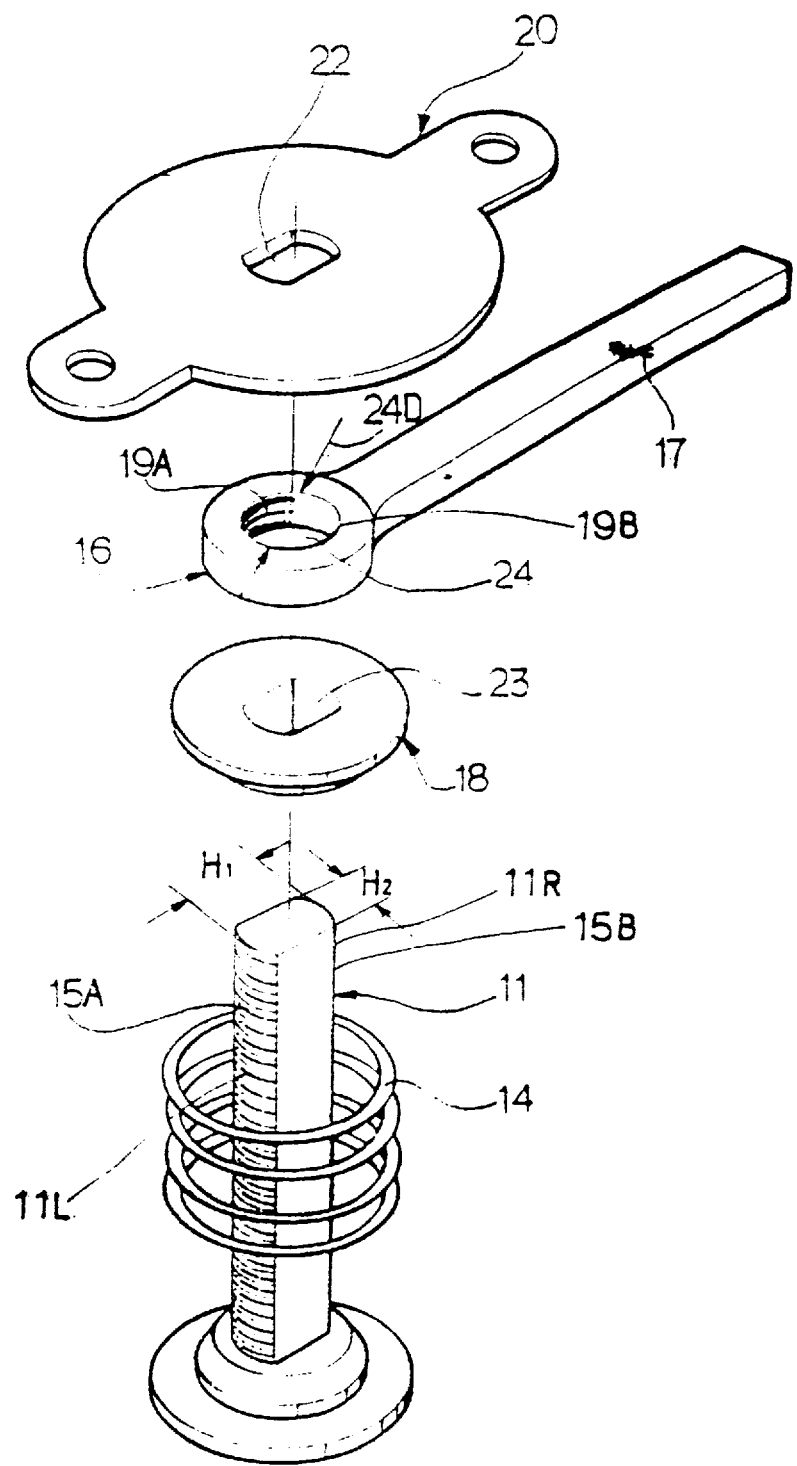
FIG. 2 is an exploded perspective view of the inventive level adjustment contrivance of FIG. 1.

Referring to FIGS. 1 and 2, there is shown an inventive adjustment leg 11 for adjusting the level of the housing 10 of a washing machine. The upper part of the adjustment leg 11 is inserted into the inside of housing 10 through a mounting hole 21, and the lower end thereof rests on a foot in the form of a rubber plate 12. A support spring 14 is mounted between the rubber plate 12 and the housing 10. A fixing member 16 is provided between the upper end of the support spring 14 and the housing 10 so as to make a rotational motion of the fixing member possible.

The cross sectional side width H1 of the adjustment leg is greater than the front-back width H2. The side surfaces 11L and 11R are shaped semicircular and provided with circumferentially spaced threaded guide portions 15A and 15B. The fixing member 16 has a second guide hole 24 to guide the adjustment leg 11. The inner peripheral surface of the hole 24 has fixing threaded portions 19A and 19B separately formed (i.e., circumferentially spaced) to respectively engage the corresponding threaded guide portions 15A and 15B.

The unthreaded portion of the inside surface of the first guide hole 24 has a diameter 24D greater than the side width H1 of the adjustment leg 11, so that the fixing member 16 may freely move axially along the adjustment leg 11 when the fixing threaded portions 19A and 19B of the adjustment leg 11 are not engaged with the corresponding threaded portions 15A and 15B of the adjustment leg 11. The fixing member 16 has a lever handle 17 provided at one side to rotate it.

In order to prevent the adjustment leg 11 from shifting or rotating, there is provided a first guide member 20 with a first guide hole 22, which is shaped to snugly guide the adjustment leg 11, the member 20 being fixedly mounted on the bottom of the housing 10. Between the fixing member 16 and the support spring 14 is mounted a second guide member 18 with a third guide hole 23 to snugly receive the adjustment leg 11, which member 18 is supported on the upper end of the support spring 14, thereby securing smooth rotational movement of the lever handle 17.

Figure 3A:
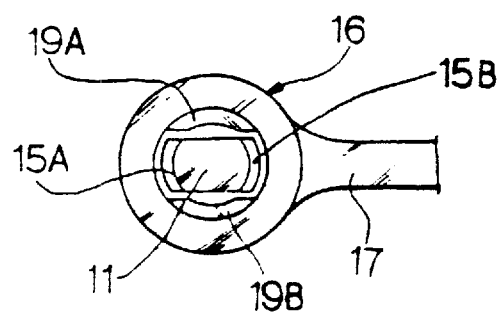
FIG. 3A is a cross sectional view for illustrating the level adjustment contrivance of FIG. 1 when releasing the adjustment leg.
Figure 3B:
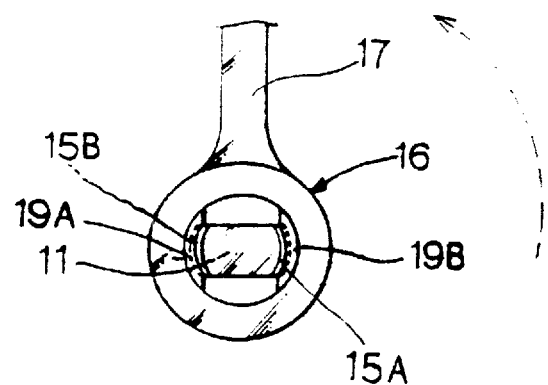
FIG. 3B is a cross sectional view for illustrating the inventive level adjustment contrivance of FIG. 1 when anchoring the adjustment leg.
Figure 4:
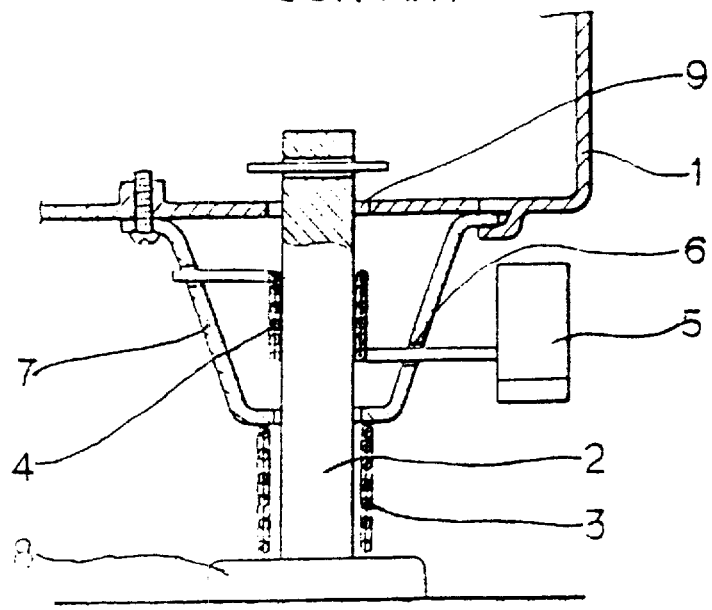
FIG. 4 is a cross sectional view for illustrating a conventional level adjustment contrivance of a washing machine.
Figure 5A:
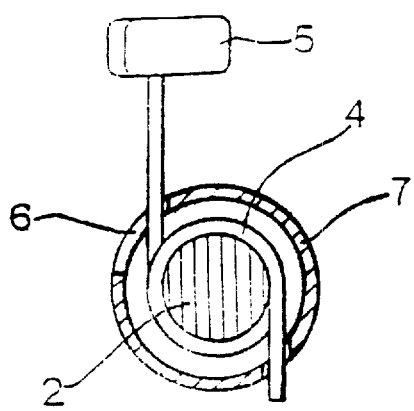
FIG. 5A is a transverse cross sectional view of FIG. 4 for illustrating the fixing of the conventional level adjustment contrivance.
Figure 5B:
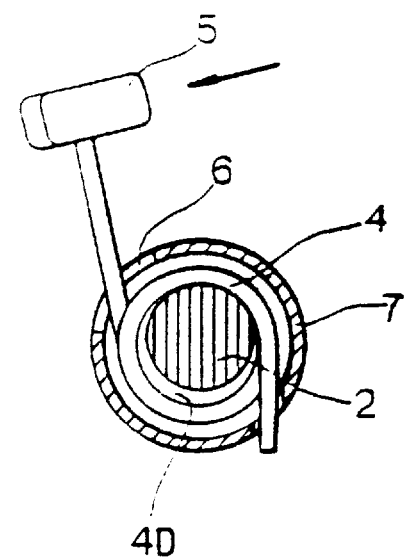
FIG. 5B is a transverse cross sectional view similar to FIG. 5A for illustrating the releasing of the conventional level adjustment contrivance.

In operation, when the lever handle 17 is rotated to release the adjustment leg 11 in order to adjust the level of the housing 10 of the washing machine, as shown in FIG. 3A, the fixing threaded portions 19A and 19B of the fixing member 16 are released from engagement with the corresponding threaded portions 15A and 15B, so that the fixing member 16 moves freely upwards along the adjustment leg 11 with the second guide member 18 by the expanding force of the support spring 14. Thereafter, housing 10 is pushed downwards to adjust the level, and then lever handle 17 is rotated as shown in FIG. 3B so as to engage the fixing threaded portions 19A and 19B with the corresponding threaded portions 15A and 15B of the adjustment leg 11.

Thus, the inventive level adjustment contrivance firmly secures the level of the housing of a washing machine.

What is claimed is:

1. A washing machine comprising a housing in combination with apparatus for enabling the housing to be made level, the housing carrying a guide member having a non-circular guide hole fixed against movement relative to the housing, the apparatus comprising:

a plurality of adjustment legs for supporting the housing on a support surface, each adjustment leg including an upper portion extending through a respective one of said guide holes; each adjustment leg including externally threaded structures spaced circumferentially apart by flats, whereby each adjustment leg is of non-circular cross section corresponding in shape to the respective said guide hole and is thereby prevented from rotating relative to the housing by the respective said guide hole;

a plurality of fixing members mounted on respective adjustment legs with the housing resting on the fixing members, each fixing member including a guide hole through which a respective adjustment leg extends, each fixing member being rotatable relative to its respective adjustment leg about an axis of the adjustment leg, the guide hole of each fixing member including circumferentially spaced internally threaded structures engageable with the externally threaded structures in one rotational position of the fixing member for preventing movement of the fixing member and housing relative to the adjustment leg along the leg axis, the internally threaded structures being disengageable from the externally threaded structures in another rotational position of the fixing member to permit the fixing member and housing to move relative to the adjustment leg along the axis of the adjustment leg; and a plurality of coil compression springs mounted on respective adjustment legs for biasing a respective fixing member upwardly.

2. The combination according to claim 1 wherein each fixing member includes a radially extending, manually grippable handle.

* * * * *